(12) United States Patent
Bruckert et al.

(10) Patent No.: US 6,226,317 B1
(45) Date of Patent: May 1, 2001

(54) METHOD AND SYSTEM FOR AIDING IN THE LOCATION OF A SUBSCRIBER UNIT IN A SPREAD SPECTRUM COMMUNICATION SYSTEM

(75) Inventors: Eugene J. Bruckert, Arlington Heights; Michael D. Kotzin, Buffalo Grove, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/050,283

(22) Filed: Mar. 30, 1998

(51) Int. Cl.[7] ........................................................ H04B 1/69
(52) U.S. Cl. .................. 375/146; 370/335; 370/342; 455/450; 455/456
(58) Field of Search .................. 375/133, 135, 375/136, 141, 144, 146, 147, 148; 370/335, 342; 455/450, 456

(56) References Cited

U.S. PATENT DOCUMENTS

| 5,235,612 | * | 8/1993 | Stilwell et al. | 375/144 |
|---|---|---|---|---|
| 5,508,708 | * | 4/1996 | Ghosh et al. | 342/457 |
| 5,736,964 | * | 4/1998 | Ghosh et al. | 342/457 |
| 5,764,188 | * | 6/1998 | Ghosh et al. | 342/457 |
| 5,923,650 | * | 7/1999 | Chen et al. | 370/331 |
| 5,949,796 | * | 9/1999 | Kumar | 370/529 |
| 6,009,087 | * | 12/1999 | Uchida et al. | 370/335 |
| 6,112,094 | * | 8/2000 | Dent | 455/452 |
| 6,128,276 | * | 10/2000 | Agee | 370/208 |

* cited by examiner

Primary Examiner—Young T. Tse
(74) Attorney, Agent, or Firm—Richard A. Sonnetag; Kenneth A. Haas

(57) ABSTRACT

A mobile subscriber unit (MS) location method and system in a spread spectrum channel coding system uses a known spread spectrum location beacon channel (34) that is time division multiplexed with normal code division multiplexed channels (36). Each base station (12, 14 and 16) in a defined service area transmits the known time division multiplexed spread spectrum location beacon signal (34), such as a known location channel, as a spread spectrum location beacon signal at a same time interval. Mobile subscriber units (18) receive the spread spectrum location beacon signal (34) time division multiplexed with the normal CDMA channels (36) and determine their own location using location techniques such as trilateration. Preferably, all of a base station's transmit power is assigned to this special known location channel (34) during transmission.

9 Claims, 3 Drawing Sheets

BTS TRANSMIT STRUCTURE WITH FULL POWER BEACON
TDM'D WITH CDM'D CONTROL AND TRAFFIC CHANNELS

METHOD AND SYSTEM FOR AIDING IN THE LOCATION OF A SUBSCRIBER UNIT IN A SPREAD SPECTRUM COMMUNICATION SYSTEM

FIELD OF THE INVENTION

The invention relates generally to wireless telecommunication systems that employ techniques for locating a mobile subscriber unit within the system, and more particularly to wireless telecommunication systems such as Code Division Multiple Access (CDMA) systems that employ spread spectrum channel coding.

BACKGROUND OF THE INVENTION

Techniques are known in wireless communication systems for locating a mobile subscriber unit, such as a hand held radio telephone or vehicle radio telephone in a radio telephone system, such as a cellular telecommunication system. In a current CDMA communication system governed by standard IS-95, a broadcast channel transmits a pilot offset index field, a base site latitude and longitude field and a list of neighboring cells. Therefore it is possible that a mobile subscriber unit can calculate its location on a latitude and longitude map using time difference of arrival (TDOA) hyperbolic coordinates if there are enough base stations within a receive range of a mobile subscriber unit.

However, a problem arises with such a system since the base station typically only devotes at most about 20% of its transmit power to the pilot sub channel. Moreover, since the CDMA system employs a spread spectrum channel coding for traffic channels at a time and frequency using multiple spreading codes, the traffic channels add a great deal of noise to the time of arrival measurements. The pilot sub channels are all transmitted continuously to a mobile subscriber unit. Generally, each base station repeats a pilot sub channel at different time intervals and the mobile subscriber unit knows the differing time intervals from pre-stored information or data sent in the broadcast channel. A mobile subscriber unit uses the pilot channel to synchronize with traffic channels. Hence a pilot sub channel is broadcast providing timing and phase synchronization to aid in subsequent demodulation of a transmitted signal. With the traffic channel noise and the low power of the pilot sub-channels, it is difficult for mobile subscriber units to perform trilateration over a large percentage area of a cellular coverage area Another known system for determining mobile subscriber unit location is to allow the mobile subscriber unit to serve as a beacon so neighboring base sites can determine a location of the mobile through trilateration techniques. The mobile subscriber unit transmits a power up function and the base sites attempt to determine a location of the mobile unit using data from three or more base sites in an area. A problem with using a mobile subscriber unit as a location beacon is that mobile subscriber units typically tend to have low power output capabilities, some as low as 0.2 watts, which does not typically afford a strong enough signal for accurate location determination. Also, there is a substantial amount of noise since mobiles are communicating the power up f unction at specified frequencies that are reused by multiple mobiles within a given coverage area.

Moreover in traditional CDMA telecommunication systems, control channels, traffic channels and the pilot subchannels are transmitted by a base station on the same frequency using different spreading codes. Therefore the noise from the traffic channel and control channels can reduce the detection abilities of mobile subscriber units to determine locations of base sites.

Consequently there exists a need for a spread spectrum channel coding system that facilitates location of mobile subscriber units by enabling a mobile subscriber unit to make required measurements for autonomously locating itself.

DETAILED DESCRIPTION OF A PREFERRED EMBODIMENT

A mobile subscriber unit (MS) location method and system in a spread spectrum channel coding system uses a known spread spectrum location beacon signal that is time division multiplexed with normal code division multiplexed channels. Each base station in a defined service area transmits the known time division multiplexed spread spectrum location beacon signal, such as a known location channel, as a spread spectrum beacon signal at a same time interval. Mobile subscriber units receive the spread spectrum location beacon signal time division multiplexed with the normal CDMA channels and determines their own location using location techniques such as trilateration. Preferably, all of a base station's transmit power is assigned to this special known location channel during transmission to extend the reception to the maximum possible range. The known location channel (spread spectrum beacon signal) amplitude is shaped to minimize interference to the code division multiplexed frames of adjacent cell transmissions.

Figure 1:
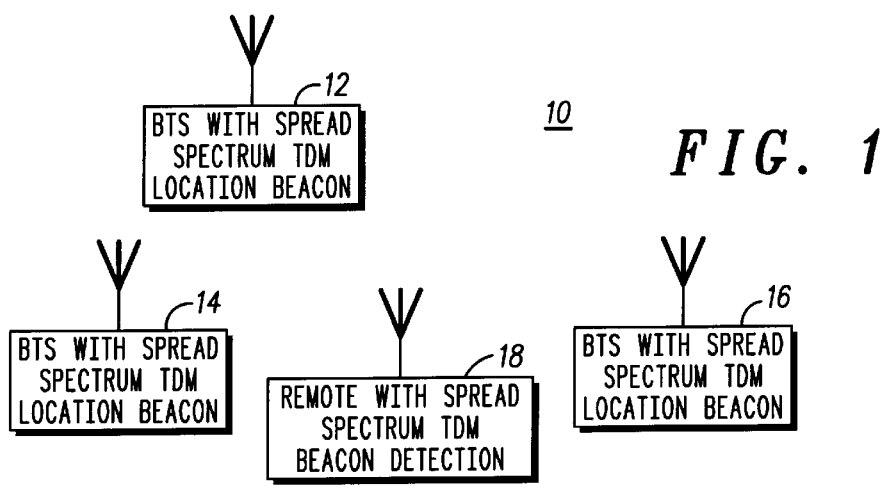
FIG. 1 is a block diagram generally showing a wireless CDMA system employing base stations with spread spectrum time division multiplex location beacon channels in accordance with the invention to a remote mobile subscriber unit having spread spectrum time division multiplex beacon detection in accordance with one embodiment of the invention.

FIG. 1 shows a code division multiple access wireless telecommunication system 10 having multiple communication units 12, 14 and 16, such as cellular CDMA base stations with spread spectrum time division multiplexed location beacon channel generators. A mobile subscriber unit 18, such as a remote communication unit, includes spread spectrum time division multiplexed beacon detection for use in determining a location of the subscriber unit 18. Each communication unit 12, 14 and 16 selectively generates a known location channel (location beacon) at a common frequency as traffic channels, using a spreading code different from spreading codes used for non-location channels such as traffic channels, traditional pilot sub channels and control channels. The base stations 12, 14 and 16 synchronously transmit the selectively generated known location channel at a same time interval. The remote unit 18 detects the known location channel which is spread spectrum time division multiplexed with non-location channels and performs time of arrival detection to determine its location within the communication system 10.

Figure 2:
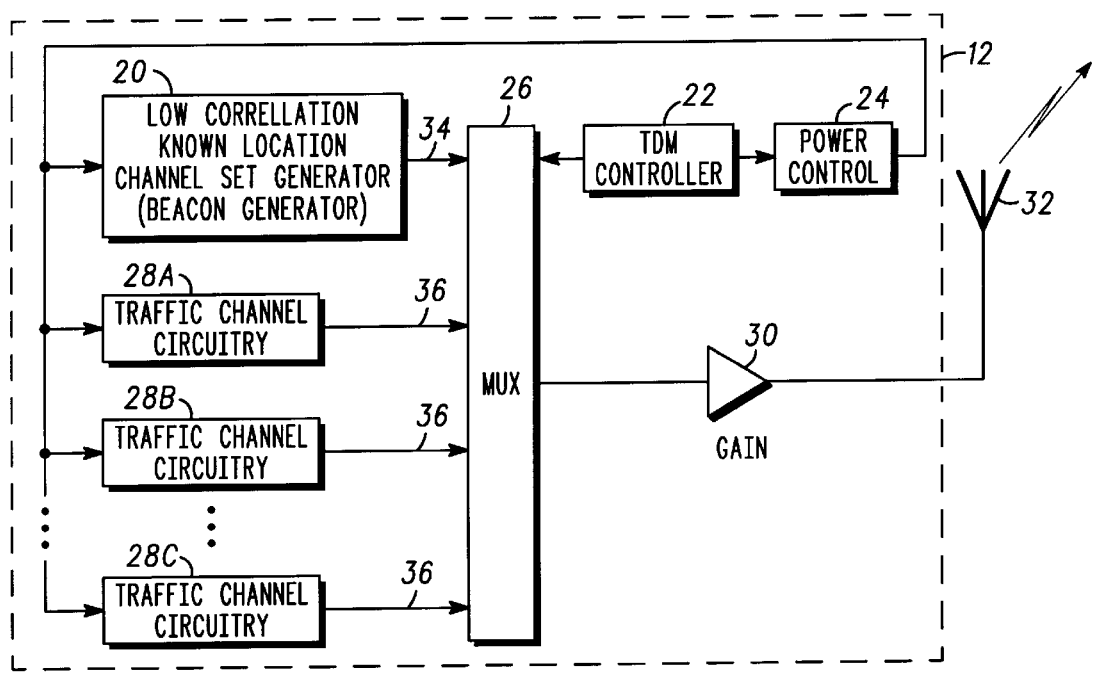
FIG. 2 is a block diagram generally depicting one embodiment of a portion of a base station employing spread spectrum time division multiplex location beacon channels in accordance with one embodiment of the invention.

FIG. 2 is a schematic block diagram generally showing an example of an embodiment of the communication unit 12 with spread spectrum time division multiplexed location beacon generation for generating the known location channel. The communication unit 12 includes a low correlation known location channel set generator 20, a time division multiplex (TDM) controller 22, power controller 24, multiplexer 26, non-location channel circuitry, such as traffic channel circuitry 28a, 28b and 28c and gain amplifier 30. The base station 12 transmits a spread spectrum signal 32 containing non-location channels and the known location channel at a common frequency. The spread spectrum signal 32 as shown is a forward channel signal as part of downlink communication to the MS 18.

The low correlation known location channel set generator 20 generates a known location channel at the common frequency using a selected orthogonal spreading code from a group of orthogonal code sequences so that the probability of false detection is reduced to an acceptable level. Preferably a small set of orthogonal codes are used for the location beacon signals in order to ease the mobile subscriber unit's search task. The code assignment to a base station may be permanent or they may rotate over time in order to reduce false alarm probability. The low correlation known signal set generator 20 spreads information with orthogonal signals over a time period such as 2.5 milliseconds of the interval. The orthogonal scrambling is known to the mobile subscriber unit through messaging over the broadcast channel on power-up or other suitable time. The low correlation known location signal set generator 20 utilizes traditional orthogonal encoding to add an orthogonal code (e.g. a 256-ary Walsh code) to each interleaved and scrambled data such that each interleaved and scrambled data are replaced by a 256 symbol orthogonal code or its inverse. These 256 orthogonal codes preferably respond to Walsh codes from a 256 by 256 Hadamard matrix wherein a Walsh code is a single row or column of the matrix. The low correlation signal set generator repetitively outputs a Walsh code or its inverse which corresponds to input data at a fixed symbol rate. However, it will recognized that any suitable coding technique may also be used.

Orthogonal code sequence assignment may be such that a set of codes is selected for each base station 12, 14 and 16 (FIG. 1), one for each sector since there are typically 1, 3, or 6 sectors per site. Different orthogonal codes are selected for other sites to form a seven site repeat pattern. Orthogonal code sequences are moved from site to site via a combination of rotation and translation. Preferably the mobile subscriber unit 18 is notified of the changes in the orthogonal coding by a base station via messaging on a broadcast channel. The orthogonal code sequences are selected as low correlation code sequences such that the codes selected for a site may be different or may be phase shifts of the same code. Similarly, codes from a seven site group may be larger shifts of the same known location channel sequence. A simple scrambling algorithm may be used to translate by one site and rotate within a seven site group. An alternative is to keep the code repeat pattern but to cyclically shift a particular site's code with respect to its co-code in the repeated pattern.

A time division multiplex controller 22 controls the multiplexer 26 to output a signal through gain amplifier 30 at a particular time interval or slot within a frame. The time division multiplex controller 22 time division multiplexes the known location channel 34 from the low correlation known location channel set generator 20 with the non-location channels 36 from the traffic channel circuitry 28a–c. The time division multiplex controller 22 ceases transmission of the non-location channels 36 in response to selective transmission of the known location channel 34 such that only one of the known location channel or the traffic channels is output at the common frequency at any point in time.

The time division multiplex controller 22 activates the power controller 24 to control the power of the low correlation known location channel set generator 20 to output a full power known location channel during the location beacon signal transmission interval. Hence the communication unit 12 generates the known location channel by controlling a power level of a known location channel 34 during time division multiplex intervals to enhance the power level, such that the power level of the known location channel is higher than a power level of a non-location channels 36 to reduce interference from the non-location channels. The power controller 24 causes the known location channel 34 to be at full power during its transmission interval and suitably controls the power level of the traffic channels circuitry 28a–28c to output the varying traffic channel power as known in the art. However, it will be recognized that a power level less than full power for the location channel may be suitable.

Figure 3:
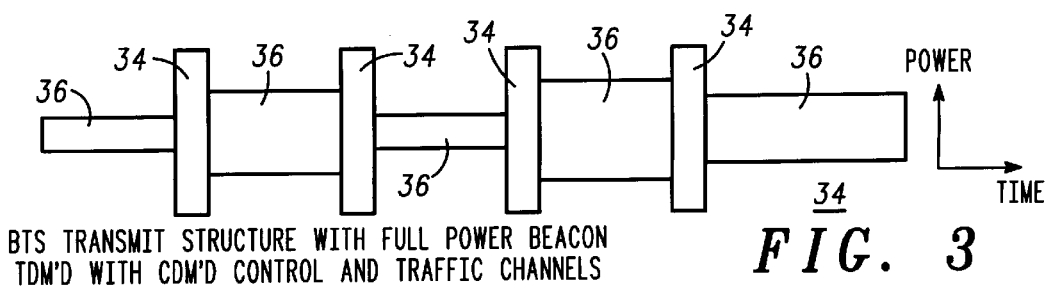
FIG. 3 is a diagram generally illustrating a base station transmit structure having full power location beacon time division multiplexed with code division multiplexed control and traffic channels in accordance one embodiment of the invention.

FIG. 3 shows an illustrative example of a spread spectrum signal structure 32 having full power known location channels, time division multiplexed with code division multiplex control and traffic channels. In a preferred embodiment, one sub frame every N frames is devoted to the known location channel (location beacon) where for example N=25 and the sub frame =10 milliseconds, applicable to a frequency supporting primarily forward channel data traffic. In an alternative embodiment, a small portion of a frame group may be devoted to the known location channel interval, for example 2.5 milliseconds every 4 frame groups, applicable to a frequency supporting primarily speech traffic channels. In either case, a vocoder is synchronized to the known location channel (location beacon) timing and outputs a shortened frame to accommodate the time division multiplexed waveform.

Figure 4:
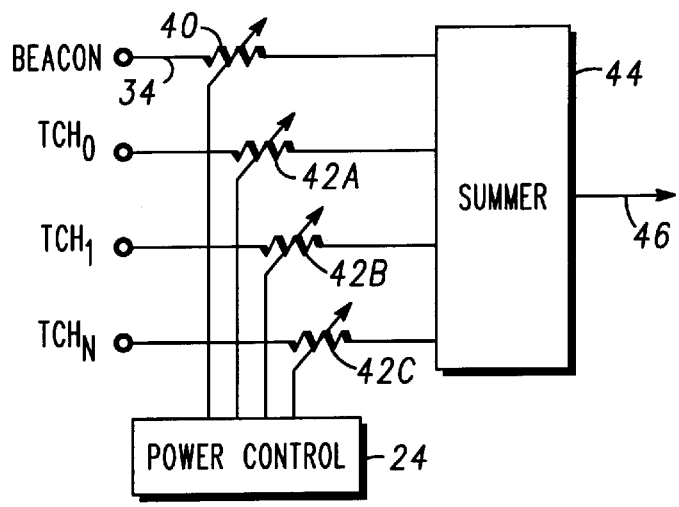
FIG. 4 is a block diagram generally illustrating one embodiment of a known location signal generating block in accordance with one embodiment of the invention.

FIG. 4 shows a more generalized embodiment of a power control arrangement for the known location channel and non-location channels of a communication unit 12. As shown, a known location channel 34 may be varied in power by the power control circuit 24 through a variable power control circuit 40, such as a variable impedance network. Likewise the traffic channels or other channels are passed through a similar power varying circuit 42a–42c and input to a summing circuit 44 whose output 46 then goes to the gain circuit 30. In operation, the power control circuit 24 reduces the location beacon signal to zero during transmission of non-location channels i.e. traffic channels TCH0–TCHn. Conversely when time division multiplexing the known location channel 34, the power control circuit 24 controls the power varying circuits 42a–42c to reduce the traffic channel power to zero thereby in effect outputting only the location beacon channel 34. Hence the known location signal 34 is separated from the other traffic channels or control channels. An alternative during transmission of the known location channel is to selectively reduce the power of traffic channels TCH0–TCH$n$. One method of selecting the traffic channels to be attenuated is to select those having the highest power.

Figure 5:
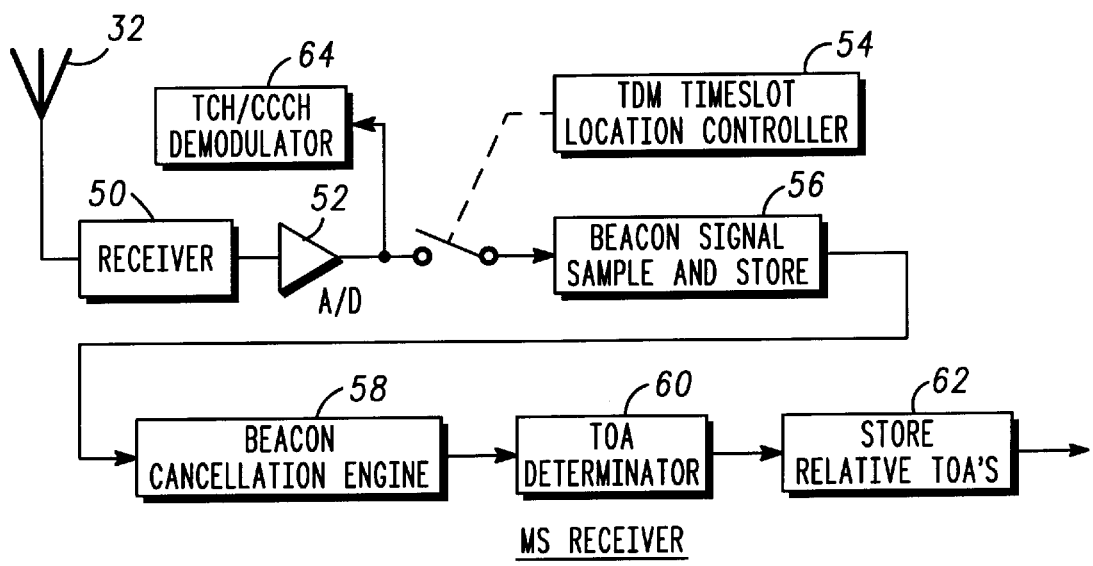
FIG. 5 is a block diagram generally illustrating a mobile subscriber unit determining its location based on the time division multiplexed location beacon channels in accordance with one embodiment of the invention.

FIG. 5 is a block diagram generally illustrating one embodiment of a mobile subscriber unit in accordance with one embodiment of the invention. The mobile subscriber unit determines the location of itself based on detecting each of the known location channels transmitted from the plurality of communication units 12, 14, and 16 by determining a time of arrival associated with each detected known location channel. The periodically generated known location channels are transmitted from each of the communication units 12, 14 and 16 at the same time interval. Hence the subscriber unit can determine a time of arrival data for the plurality of received known location channels for use in determining a location of the subscriber unit.

The mobile subscriber unit 18 includes a traditional CDMA receiver 50 for receiving a spread spectrum signal 32. The remote mobile subscriber unit 18 also includes an analog to digital (A/D) converter 52, a time division multiplexed time slot location controller 54, a known location signal (location beacon) signal sample and store stage 56, a beacon cancellation engine 58, a time of arrival determinator 60 and a time of arrival storage element 62. The A/D converter 52 converts the received spread spectrum signal 32 to digital signals which are then routed to a traffic channel or control channel demodulator 64 and selectively routed to the beacon signal sample and store 56 under control of the TDM time slot location controller 54. The TDM time slot location controller 54 operates to selectively route received spread spectrum signal data, by determining a time division multiplexed slot associated with each received known location channel from non-location channel slots corresponding to the known location channel data. This is done by conventional frame synchronization circuits that detect the frames containing the known location channel data. Preferably the known location channel data frame timing is preprogrammed into the mobile unit. However, the frame timing may be varied and communicated to the mobile unit over a control channel or other channel. When the TDM time slot location controller 54 switches in known location channel data, the beacon signal sample and store stage 56 samples the incoming data and stores samples of known location channel information for processing to determine a location of the subscriber unit.

The beacon cancellation engine performs interference cancellation on the received known location channel data to facilitate recovery of time difference of arrival data from the known location channels transmitted at the same time interval by the plurality of communication units. The beacon cancellation engine may be, for example, of the type as taught in U.S. Pat. No. 5,235,612 (the '612 Patent), issued Aug. 10, 1993 to instant assignee and incorporated herein by reference. For example, the stored samples are convolved with a replica of the known location signals. An estimate of the amplitude and phase of the strongest received known location signals is found and those signals are subtracted from the stored samples. This continues until no more known location signals are found.

Once the interference is reduced by the beacon cancellation engine 58, the mobile subscriber unit uses a time of arrival determinator 60 to determine the strongest base station transmitters that occur during the location beacon transmission interval. The time of arrival determinator determines the earliest arriving ray from each base station within range. Since there are no other channels transmitted within this interval, interference is minimized. The time of arrival information indicating the earliest time of arrivals from all base stations within the range are stored in relative TOA store 62 and then used by the mobile subscriber unit 18 to perform traditional trilateration algorithms to determine a longitude and latitudinal coordinate for the mobile subscriber unit.

Where there is interference due to delayed rays from the base station and interference from other base stations, the interference should be canceled out according to the '612 Patent. There may still be location uncertainty due to visibility to an insufficient number of sites. Known amplitude difference angle of arrival techniques may be employed to form a crude angle estimate from the strongest site or sites if it is sectored. The mobile subscriber unit will make an accurate amplitude measurement of the strongest and second strongest transmitters from as many sites as possible.

Moreover, time of arrival measurements of the strongest transmitters (base stations) may occur during the information transmission interval if a standard pilot signal is strong enough, thus freeing the available resources of the mobile subscriber unit to concentrate on the weaker time of arrival measurements during the location beacon transmission interval. The subscriber unit then sets up the beacon cancellation engine 58 if needed.

If desired, a forward channel message may be defined to request the mobile subscriber unit to return location information. Hence the subscriber unit 18 may return location information to a requester, such as a cellular network controller or base site controller in response to received request information such as a forward channel message. Return data may include the identification of all base stations within range, identification of an earliest arriving base station signal, the time of arrival of each base station signal relative to the earliest arriving signal, prompt ray amplitude data corresponding to each base station signal, indication data representing whether a reported ray is a strongest ray received from that base station, measurement quality data, estimate data representing the mobile subscriber speed and other data if desired.

Figure 6:
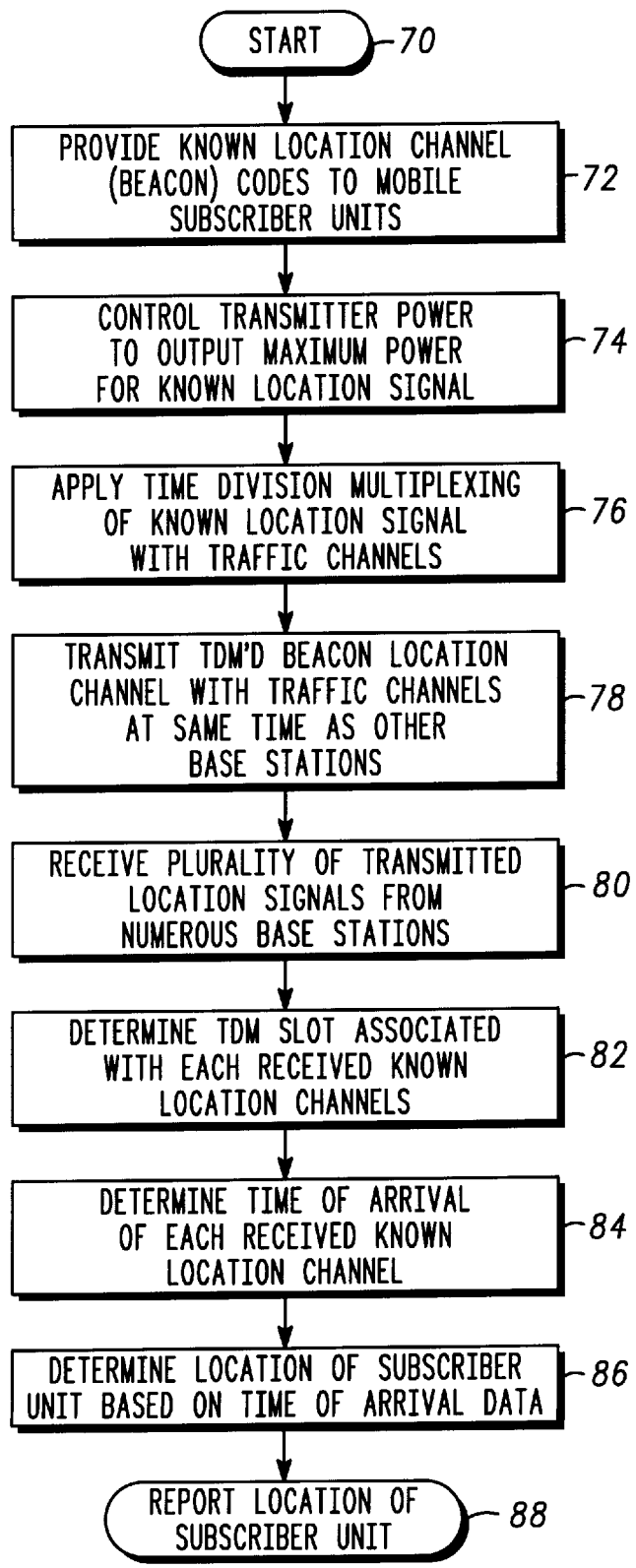
FIG. 6 is a flowchart generally illustrating the operation of a CDMA system employing multiplexed pilot channel and a mobile subscriber unit determining its location based on the multiplexed pilot channel information in accordance with one embodiment of the invention.

FIG. 6 is a flow chart showing an example of the operation of a system 10 employing spread spectrum TDM location beacon signaling. As shown in block 70, initial power-up information is communicated between a mobile subscriber unit and a serving base site. In block 70, the base site provides known location channel codes to the mobile subscriber unit over the broadcast channel. The base station then controls transmitter output to provide maximum power output for known location signal time division multiplexed interval as shown in 74 when transmitting the known location signal. As part of this process, the base station supplies the time division multiplexing of the known location signal with other traffic channels as shown in block 76 to output a dedicated location beacon channel multiplexed with other traffic channels at a common frequency.

As shown in block 78, the base station transmits the time division multiplexed location beacon channel with traffic channels at the same time as other base stations within the system. As shown in block 80, the mobile subscriber unit simultaneously receives all of the copies of the transmitted location channels from the numerous base stations. The mobile subscriber unit determines the time division multiplex slot associated with each received known location channel to selectively process the location beacon data as shown in block 82. The mobile subscriber unit then determines the time of arrival of each received known location channel as shown in block 84 and then determines the location of itself based on the time arrival data as shown in block 86. If requested, the mobile subscriber unit then reports its location to a requesting base site or other requester as shown in block 88.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for aiding in determining a location of a subscriber unit in a system employing spread spectrum channel coding for a plurality of non-location channels at a first frequency comprising the steps of:

selectively generating a known location channel at the first frequency using a spreading code different from spreading codes used for the plurality of non-location channels;

transmitting the selectively generated known location channel at a same time interval as a plurality of communication units for aiding in determining the location of the subscriber unit, wherein the known location channel is selected from a group of orthogonal code sequences.

2. The method of claim 1 including the step of reducing interference from the plurality of non-location channels by enhancing a transmit power level of the known location channel relative to a transmit power level of the plurality of non-location channels.

3. The method of claim 1 wherein the non-location channels include at least first and second traffic channels and the method includes the step of ceasing transmission on the first and second traffic channels in response to selective transmission of the known location channel.

4. The method of claim 1 wherein the step of selectively generating the known location channel includes time division multiplexing the known location channel with the non-location channels at the first frequency.

5. The method of claim 4 wherein selectively generating the known location channel includes controlling a power level of the known location channel during time division multiplexed intervals such that the power level is at a maximum power level.

6. The method of claim 1 including determining the location of the subscriber unit based on detecting each of the known location channels transmitted from the plurality of communication units and determining a time of arrival associated with each detected known location channel.

7. A base station for aiding in locating a subscriber unit in a system employing spread spectrum channel coding for a plurality of non-location channels at a first frequency comprising:

means for selectively generating a known location channel at the first frequency using a spreading code different from spreading codes used for the non-location channels;

means, operatively coupled to the means for selectively generating, for transmitting the selectively generated known location channel at a same time interval as a plurality of other communication units for for aiding in determining a location of the subscriber unit, wherein the means for selectively generating includes means for generating the non-location channels that include at least first and second traffic channels.

8. The base station of claim 7 wherein the means for selectively generating the known location channel includes means for reducing interference from the non-location channels by enhancing a transmit power level of the known location channel relative to a transmit power level of the non-location channels.

9. The base station of claim 7 wherein the means for selectively generating the known location channel includes means for time division multiplexing the known location channel with the non-location channels at the first frequency.

* * * * *